J. BROWN.
DEVICE FOR LIFTING AUTOMOBILES OUT OF MUD HOLES.
APPLICATION FILED JULY 3, 1916.
1,226,458.
Patented May 15, 1917.
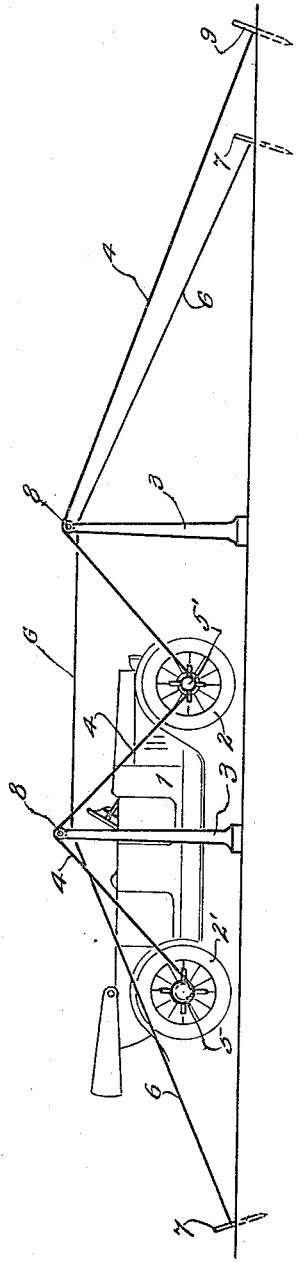
Witnesses
Inventor

UNITED STATES PATENT OFFICE.

JAMES BROWN, OF COLUMBIA, MISSOURI.

DEVICE FOR LIFTING AUTOMOBILES OUT OF MUD-HOLES.

1,226,458.  Specification of Letters Patent.  Patented May 15, 1917.

Application filed July 3, 1916. Serial No. 107,252.

*To all whom it may concern:*

Be it known that I, JAMES BROWN, a citizen of the United States, residing at Columbia, in the county of Boone and State of Missouri, have invented certain new and useful Improvements in Devices for Lifting Automobiles Out of Mud-Holes, of which the following is a specification.

This invention relates to improvements in attachments for automobiles, particularly those adapted to enable the vehicle to be readily moved when it has become caught in a mud hole, heavy sand or the like.

The principal object of the invention is to provide means for lifting an automobile clear of the ground so that planks or other material can be disposed beneath the wheels thereof.

An additional object is to provide a simply constructed device for permitting the vehicle to be easily lowered after it has been raised.

With these and other objects in view, my invention resides in the novel features of construction, combination and arrangement of parts which will be hereinafter more particularly described and claimed and shown in the drawing wherein:—

The figure represents a side elevation of an automobile showing the means for raising the same above the surface of the ground.

In the accompanying drawings wherein similar characters designate like parts throughout the several views, 1 denotes an automobile of any ordinary or preferred construction having front and rear wheels 2 and 2' respectively. In case the vehicle becomes caught in a mud hole or the like, my improved attachments are removed from the body of the car and set up in suitable positions so that the vehicle may be raised sufficiently to allow the mud hole to be filled up.

The attachments comprise four standards 3 of suitable height, a pair of cables 4 and a plurality of drums 5 and 5'. The standards 3 may be readily carried upon the running boards of the machine while the other parts may be stored elsewhere about the car. When the standards are to be used, they are removed from the running boards and set up as shown in the drawing, two being disposed on each side of the car adjacent the front and rear wheels. The rear standards are disposed near to the rear wheels while the front standards are placed about eighteen inches, more or less, in front of the front wheels. In order to steady the standards and hold them in vertical position, suitable guy-ropes 6 are attached thereto and to the ground, stakes or the like 7 being driven into the ground and the ends of the ropes secured thereto.

The upper ends of the standards 3 each carry rollers or pulleys 8 over which are trained the cables 4, the forward end of each being secured to a stake 9 driven into the ground in front of the vehicle, while the other ends of the cables are suitably attached to the winding drums 5, the intermediate portions of the cables engaging the drums 5' on the front wheels 2.

When the parts are arranged as above described and shown in the figure of the drawings, the vehicle is ready to be elevated above the surface of the ground in order that the mud holes in which certain of the wheels have sunk may be filled. This raising of the machine is accomplished by rotation of the rear wheels by means of the engine or in any other manner, thereby causing the cables 4 to be wound upon the drums 5. This shortening of the cables causes the vehicle to be elevated off the ground, and if the weight of the machine is evenly distributed, it will be raised substantially horizontally. The vehicle may be lowered after the mud holes have been filled by reversing the direction of rotation of the rear wheels or in any other preferred manner.

I claim:—

1. The combination with a vehicle, of a pair of standards disposed one on each side of said vehicle, guides on the upper ends of said standards, winding drums on the rear wheels of said vehicle, and a pair of cables disposed over said guides, one end of each being secured to one of said drums, the other ends being anchored.

2. The combination with a vehicle, of a pair of standards disposed one on each side of said vehicle, drums on the wheels of said vehicle, and a pair of cables disposed over the ends of the standards, one end of each cable being secured to one of the drums on the rear wheels of the vehicle, the other ends of said cables being anchored, the drums on the front wheels of the vehicle engaging the intermediate portions of said cables.

3. The combination with a vehicle, of two pairs of standards, one pair being disposed on each side of said vehicle adjacent the wheels thereof, guides on the upper ends of the standards, a pair of cables disposed over the said guides, one end of each cable being attached to the vehicle, the other ends being anchored, and means for shortening said cables to raise the vehicle.

4. The combination with a vehicle, of two pairs of standards, one pair being disposed on each side of said vehicle adjacent the wheels thereof, guides on the ends of said standards, a drum on each wheel of said vehicle, a pair of cables disposed over said guides, one end of each cable being secured to the drums on the rear wheels, the other ends of the cables being anchored, the other drums being engaged with said cables intermediate the standards, and means for rotating the drums on said rear wheels.

JAMES BROWN.

Copies of this patent may be obtained for five cents each, by addressing the "Commissioner of Patents, Washington, D. C."